(12) United States Patent
Alshawabkeh et al.

(10) Patent No.: US 10,838,870 B2
(45) Date of Patent: Nov. 17, 2020

(54) AGGREGATED WRITE AND CACHING OPERATIONS BASED ON PREDICTED PATTERNS OF DATA TRANSFER OPERATIONS

(71) Applicant: EMC IP Holding Company LLC, Hopkinton, MA (US)

(72) Inventors: Malak Alshawabkeh, Franklin, MA (US); Steven John Ivester, Worcester, MA (US); Ramesh Doddaiah, Hopkinton, MA (US); Kaustubh S. Sahasrabudhe, Westborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/386,795

(22) Filed: Apr. 17, 2019

(65) Prior Publication Data

US 2020/0334155 A1   Oct. 22, 2020

(51) Int. Cl.
*G06F 12/0862*   (2016.01)
*G06N 3/08*   (2006.01)
*G06F 9/30*   (2018.01)

(52) U.S. Cl.
CPC .......... *G06F 12/0862* (2013.01); *G06N 3/08* (2013.01); *G06F 9/30047* (2013.01); *G06F 2212/6024* (2013.01)

(58) Field of Classification Search
CPC .......... G06N 3/08; G06N 3/0445; G06N 3/02; G06N 20/00; G06F 12/0862;

(Continued)

(56) References Cited

U.S. PATENT DOCUMENTS 9,298,633 B1\* 3/2016 Zhao ................... G06F 12/0862
2011/0238920 A1\* 9/2011 Hooker ............... G06F 12/0862
711/136

(Continued)

OTHER PUBLICATIONS

Gianluca Dini et al., Caching and prefetching algorithms for programs with looping reference patterns, The Computer Journal Advance Access published Oct. 14, 2005, revised Jul. 14, 2005. (Year: 2005).\*

*Primary Examiner* — William E. Baughman
(74) *Attorney, Agent, or Firm* — Amin, Turocy & Watson, LLP

(57) ABSTRACT

The described technology is generally directed towards caching and aggregated write operations based on predicted patterns of data transfer operations. According to an embodiment, a system can comprise a memory that can store computer executable components, and a processor that can execute the computer executable components stored in the memory. The components can comprise a pattern identifying component to identify a first pattern of data transfer operations performed on a data store, resulting in an identified first pattern, based on monitored data transfer operations. The components can further comprise a pattern predicting component to predict a second pattern of future data transfer operations performed on the data store, resulting in a predicted second pattern, based on the identified first pattern. The components can further comprise a host adapter to generate a data transfer operation to be performed on the data store based on the predicting the second pattern.

20 Claims, 10 Drawing Sheets

(58) Field of Classification Search
CPC ......... G06F 12/0868; G06F 2212/6026; G06F 2212/6028; G06F 2212/602; G06F 2212/6024; G06F 2212/1016; G06F 2212/1024; G06F 9/30047; G06F 9/3842; G06F 9/383; G06F 9/3802; G06F 9/30043; G06F 3/061; G06F 3/0655; G06F 9/6256; H04L 7/2847
USPC ................ 711/137, 213, 133, 158, 159, 204, 711/E12.057, 218; 712/207, 237, 239, 712/225, 233, E9.033, E9.056, E9.058; 706/25, 141, 20, 15, 16, 21, 14; 700/48
See application file for complete search history.

(56) References Cited

U.S. PATENT DOCUMENTS

| | | | | |
|---|---|---|---|---|
| 2012/0041914 | A1* | 2/2012 | Tirunagari | G06F 12/121 706/15 |
| 2017/0168947 | A1* | 6/2017 | Lesecq | G06F 12/0862 |
| 2018/0150125 | A1* | 5/2018 | Homchaudhuri | G06F 1/3275 |
| 2019/0243552 | A1* | 8/2019 | Maharana | G06F 11/34 |
| 2019/0243570 | A1* | 8/2019 | Mittal | G06F 3/061 |
| 2019/0243695 | A1* | 8/2019 | Mittal | G06F 9/544 |
| 2019/0370632 | A1* | 12/2019 | Hashemi | G06N 3/084 |

* cited by examiner

AGGREGATED WRITE AND CACHING OPERATIONS BASED ON PREDICTED PATTERNS OF DATA TRANSFER OPERATIONS

TECHNICAL FIELD

The subject application generally relates to storage systems, and, for example, to adaptive tuning of read and write operations, and related embodiments.

BACKGROUND

Caching is important for the operation of computer applications. Because data caches are of limited size compared to the amount of storage of modern computers, the management of limited cache resources can be a significant factor in the efficacy of the cache for a particular application. Efficient cache management can improve the performance of storage systems in some circumstances. For example, the least-recently-used (LRU) caching algorithm, which replaces the page whose previous reference is farthest in the past, can provide good performance in a variety of contexts, especially with randomly arranged data.

The performance of caches can be inhibited in some circumstances. For example, for applications with particular patterns of data transfer transactions, a page that is cleared from the cache can be the page that is required next, e.g., LRU can evict pages just before they are referenced again, thereby causing a need to fetch all pages at each iteration.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components can comprise a pattern identifying component to identify a first pattern of data transfer operations performed on a data store, resulting in an identified first pattern, wherein the identifying is based on monitored data transfer operations. The components can further comprise a pattern predicting component to predict a second pattern of future data transfer operations performed on the data store, resulting in a predicted second pattern, wherein the predicting is based on the identified first pattern. The components can further comprise a host adapter to generate a data transfer operation to be performed on the data store based on the predicted second pattern.

According to another embodiment, a computer-implemented method can comprise training, by a neural network process executed by a processor, a neural network, based on operation data corresponding to data transfer operations performed on a data store. The computer-implemented method can further comprise identifying, by the neural network process based on the trained neural network, a first pattern of data transfer operations performed on the data store. Further, the computer-implemented method can comprise predicting a second pattern of future data transfer operations performed on the data store, wherein the predicting can be based on the first pattern, wherein a data transfer operation to be performed on the data store can be generated based on the second pattern.

According to another embodiment, a computer program product is provided. The computer program product can comprise machine-readable storage medium comprising executable instructions that, when executed by a processor, can facilitate performance of operations comprising identifying a first pattern of data transfer operations performed on a data store, wherein the identifying can be based on monitored data transfer operations. The operations can further comprise predicting a second pattern of future data transfer operations performed on the data store, wherein the predicting can be based on the first pattern. Further, the operations can comprise generating a data transfer operation to be performed on the data store based on the second pattern. Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards facilitating caching and aggregated write operations based on predicted patterns of data transfer operations. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., aggregate write and caching operations based on predicted patterns of data transfer operations), that are not abstract and cannot be performed as a set of mental acts by a human. For example, a human, or even a plurality of humans, cannot efficiently, accurately and effectively, manually detect patterns of operations and use these patterns to perform caching and aggregated write operations, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
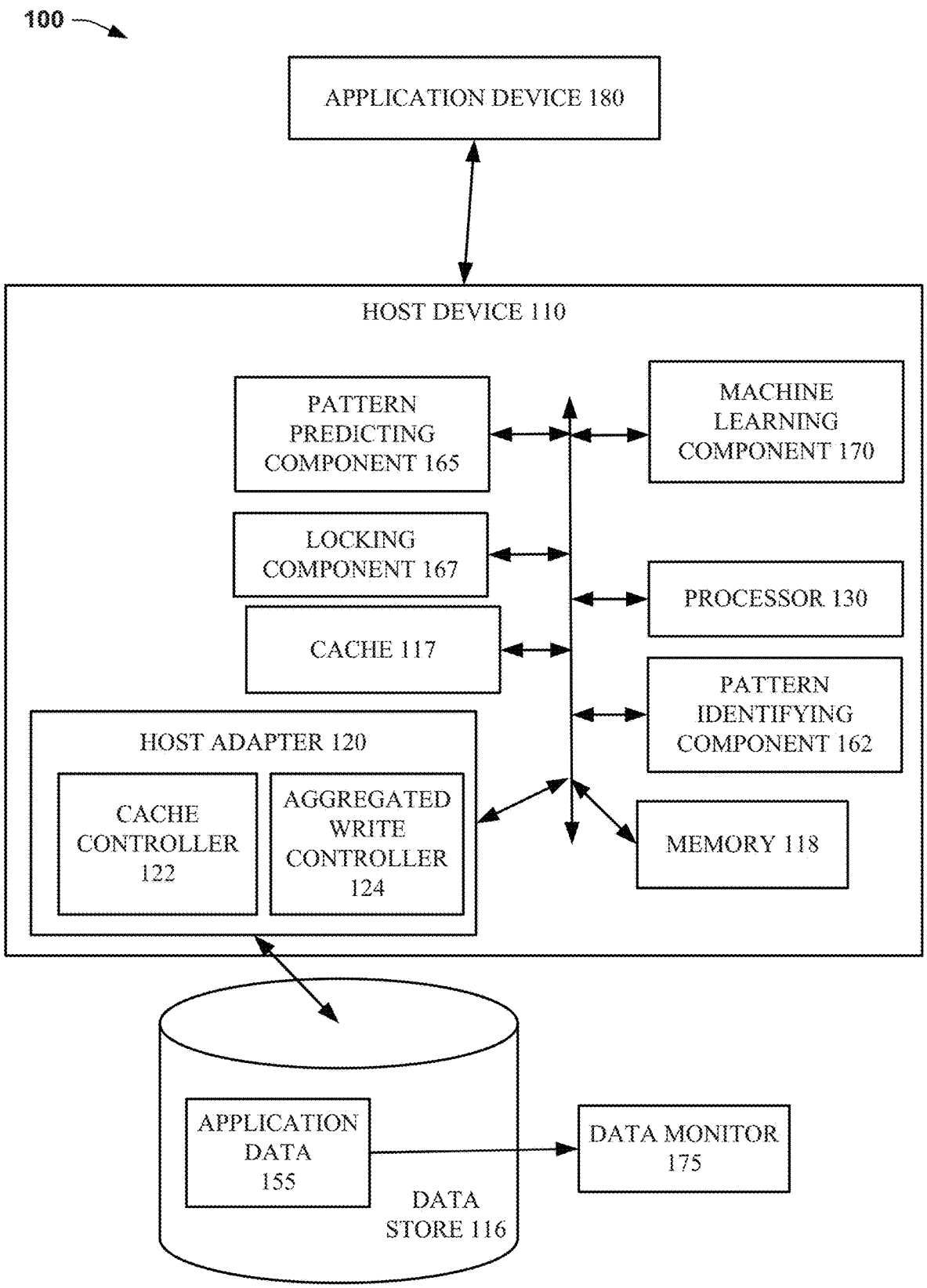
FIG. 1 illustrates a block diagram of an example, non-limiting system that can facilitate caching and aggregated write operations based on predicted patterns of data transfer operations, in accordance with various aspects and implementations of the subject disclosure.

FIG. 1 illustrates a block diagram of an example, non-limiting system 100 that can facilitate aggregated write and caching operations based on predicted patterns of data transfer operations, in accordance with various aspects and implementations of the subject disclosure.

In one or more embodiments, system 100 can identify a first pattern of data transfer operations performed on application data 155 in data store 116. As discussed further herein, application data 155 can be data of application device 180. For example, if application device 180 is a database of transactions, application data 155 can be the stored transactions, and application device 180 can be the database application that can add, retrieve, and update the application data during operation of the application. In one or more embodiments of system 100, the identifying of the first pattern can be based on monitored data transfer operations, e.g., read operations that can transfer data from host device 110 to data store 116, and write operations that can transfer data from host device 110 to data store 116. In one or more embodiments, host device 110 can be a PowerMax® Data Storage Array, provided by DELL EMC.

As described further below, the identification of patterns in the data transfer operations of application data 155 can be performed by a variety of approaches, including, but not limited to machine learning (ML). An example implementation of a machine learning approach to identification of data transfer patterns in data transfer data, that can be used by one or more embodiments, is described with FIG. 2 below.

Figure 4:
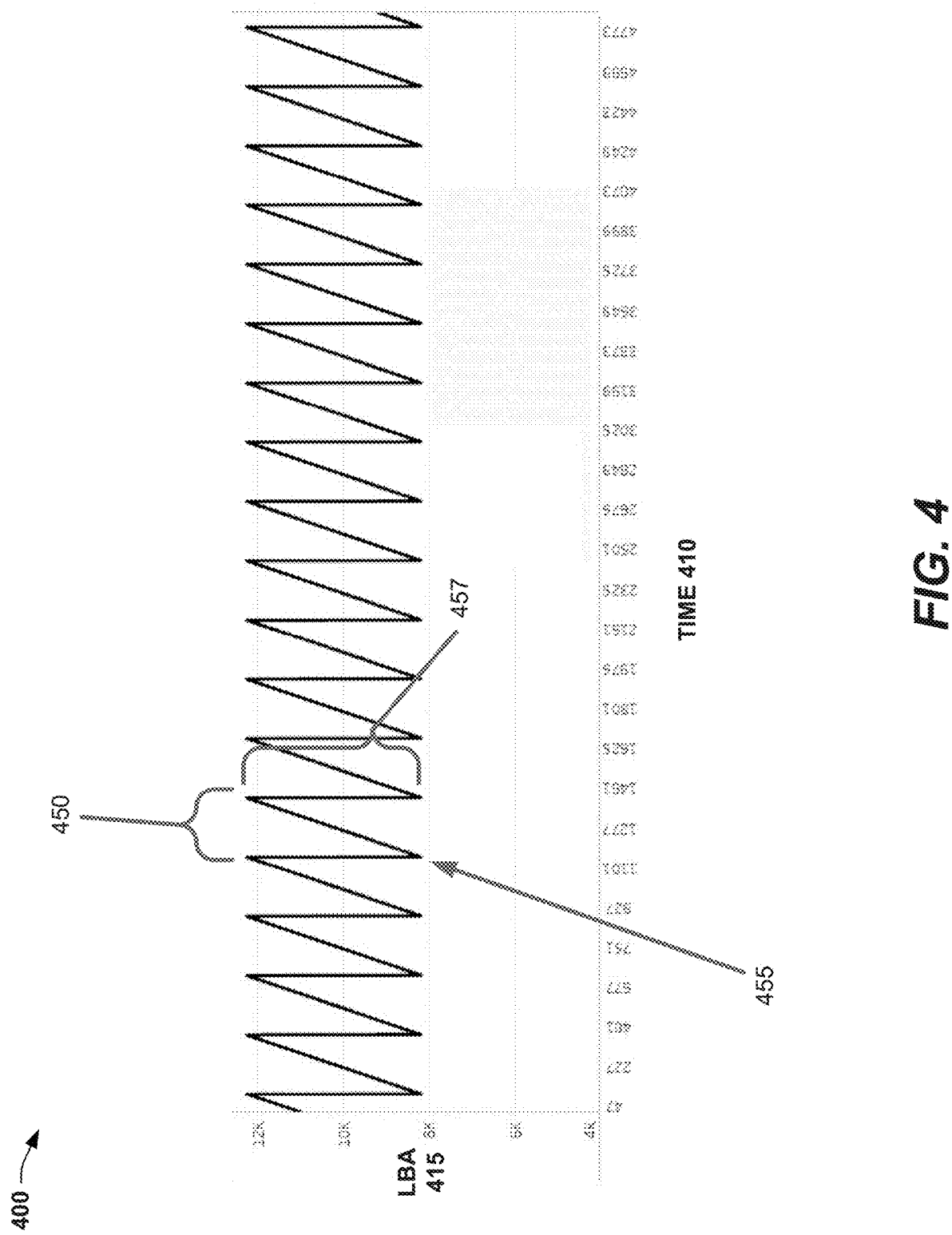
FIG. 4 illustrates a chart of underlying data of an example implementation of one or more embodiments.

In one or more embodiments, system 100 can predict, based on the identified first pattern, a second pattern of future data transfer operations that can be expected to be performed on application data 155. As depicted in FIG. 4 below, many applications can have repeating patterns of read operations, e.g., retrieving data for the processing of transactions, and the generation of reports or user interface elements, such as selection lists.

Example elements that can be analyzed by one or more embodiments include, but are not limited to, the presence of loops in the data (e.g., reads from a repeating sequence of data elements, such as pages), and the caching approach currently used to handle the data. For example, when a loop of a particular length is identified, and this loop is currently handled by an approach that evicts the pages that were accessed longest in time ago, one or more embodiments can identify the performance benefits which could, in some circumstances, be achieved by a different strategy, e.g., evicting the oldest data in the cache can, if loops of reads are regularly performed, potentially lead to eviction at a point before the data is sought to be retrieved.

Similar to the identifying of the data transfer operations discussed above, in one or more embodiments, system 100 can predict future data transfer operations by a variety of approaches, including, but not limited to machine learning (ML). An example implementation of a machine learning approach to predict data transfer patterns is described with FIG. 2 below. As discussed further below, based on the predicted upcoming reads of pages, an operation that can retrieve the data of this prediction in advance of the request being received from application device 180 through host device 110.

In some embodiments, processor 130 can comprise one or more of a central processing unit, multi-core processor, microprocessor, dual microprocessors, microcontroller, System on a Chip (SOC), array processor, vector processor, and/or another type of processor. Further examples of processor 130 are described below with reference to processing unit 1014 and FIG. 10. Such examples can be employed with any embodiments of the subject disclosure.

As discussed further below with FIG. 10, in some embodiments, memory 118 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 118 are described below with reference to system memory 1016 and FIG. 10. Such examples of memory 118 can be employed to implement any embodiments of the subject disclosure.

According to multiple embodiments, processor 130 can comprise one or more types of processors and/or electronic circuitry that can implement one or more computer and/or machine readable, writable, and/or executable components and/or instructions that can be stored on memory 118. For example, processor 130 can perform various operations that can be specified by such computer and/or machine readable, writable, and/or executable components and/or instructions including, but not limited to, logic, control, input/output (I/O), arithmetic, and/or the like.

In one or more embodiments, in an example approach to performing the operations above, processor 130 can execute components including pattern predicting component 165, pattern identifying component 162, and host adapter 120 that can have a cache controller 122. For example, pattern identifying component 162 can identify the first pattern of data transfer operations performed on data store 116, and the identifying can be based on monitored data transfer operations, e.g., by data monitor 175.

Further, pattern predicting component 165 to predict the second pattern of future data transfer operations performed on data store 116, and the predicting can be based on the first pattern identified by pattern identifying component 162. Based on the second pattern, a host adapter can generate a data transfer operation to be performed on the data store based on the predicting the second pattern. In the caching example described below with FIGS. 3 and 4, cache controller 122 can perform a data transfer operation corresponding to retrieving memory contents from pages corresponding to the predicted future read operations. In an aggregated write example described with FIGS. 5 and 6 below, host adapter 120 can comprise an aggregated write controller 124 that can perform aggregated write operations based on predicted data transfer operations, e.g., write data transfer operations.

Figure 2:
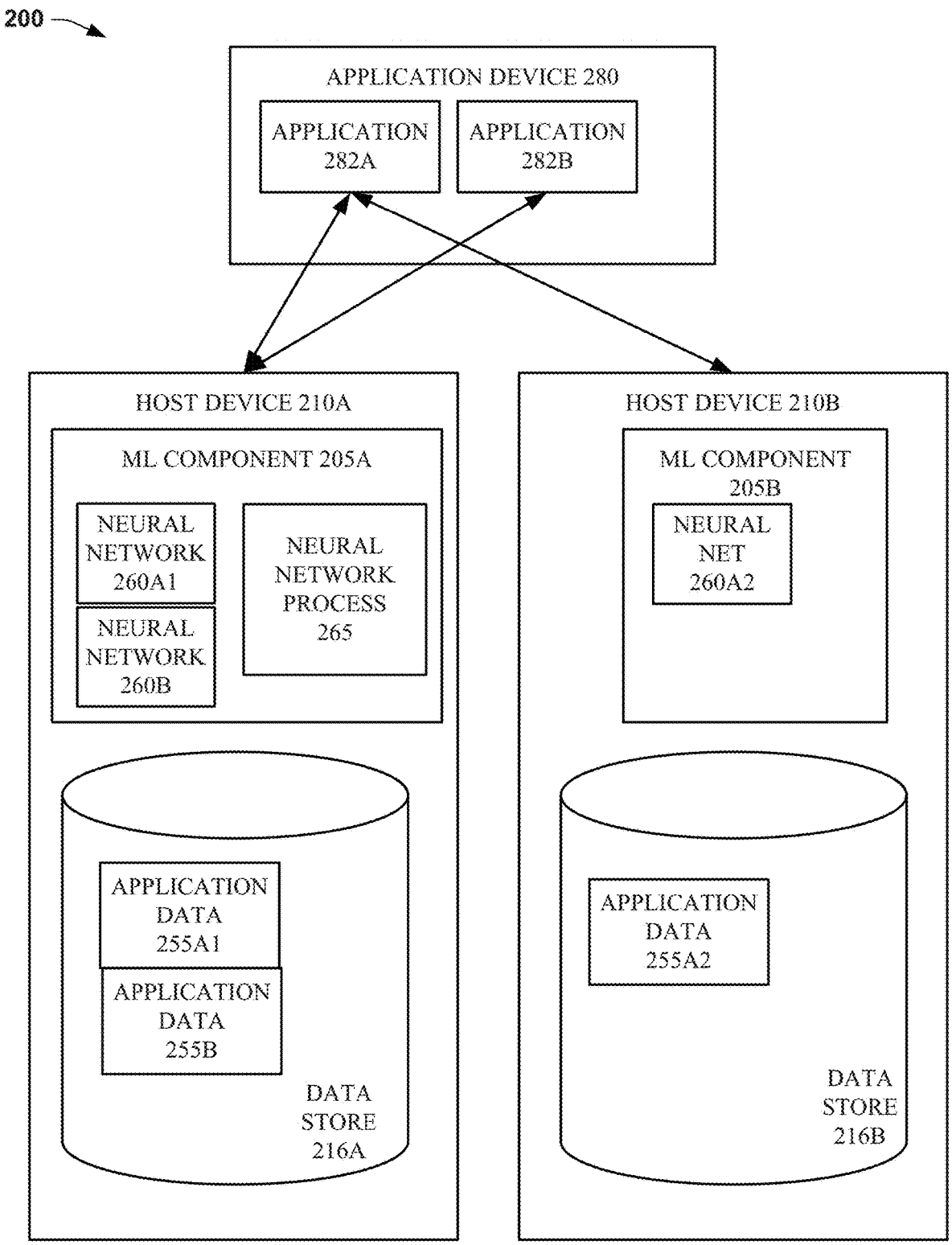
FIG. 2 illustrates an implementation of an example, non-limiting system that can facilitate caching and aggregated write operations based on predicted patterns of data transfer operations by employing machine learning components, in accordance with one or more embodiments described herein.

FIG. 2 illustrates an implementation of an example, non-limiting system that can facilitate aggregated write and caching operations based on predicted patterns of data transfer operations by employing machine learning components 205A-B, in accordance with one or more embodiments described herein. Repetitive description of like elements and/or processes employed in respective embodiments is omitted for sake of brevity.

This figure depicts application device 280 as hosting two applications 282A-B, and host devices 210A-B respectively, being communicatively coupled to application device 280, can, working individually or in tandem, provide application data for the applications. communicatively coupled to host devices 210A-B. Both host devices 210A-B can, in an example, have components described with host device 110 above, with ML components 205A-B and data store 216A-B shown for this example. Data store 216A is depicted with data stores corresponding to application data 255A1 and application data 255B, for applications 282A-B respectively, and data store 216B is depicted as storing application data 255A2, for application 282A.

As noted above, the identification and prediction of patterns in the data transfer operations of application data 255A1-2 and application data 255B can be performed by a variety of approaches, including, but not limited to machine learning (ML). In this example, ML components 205A-B can be employed, and each ML component can have one or more neural networks 260A1-2 and 260B that can be used for identifying and predicting patterns, as described herein. In one or more embodiments, neural network process 265 can optimize neural networks 260A1-2 and 260B to perform the pattern analysis and prediction described herein.

One type of neural network that has characteristics that can benefit one or more embodiments described herein is a Long Short-Term Memory (LSTM) neural network. Generally speaking, Long Short-Term Memory (LSTM) networks, as used by one or more embodiments, are neural networks that can have loops in them and allow some data to persist from one analysis to another. When one or more embodiments use data corresponding to data transfer operations to train an LSTM neural network to identify and predict data transfer operations, this persistence of some data can be advantageous. One or more approaches to persisting data in a LSTM is to identify an analysis window to be used by the training, e.g., the number of past operations to consider when pattern identification or prediction is performed.

In one or more embodiments, a neural network can be developed and updated for each specific applications. For example, host device, providing data for applications 282A-B, has a neural network for each application. As would be appreciated by one having skill in the relevant arts, given the disclosure herein, different applications can have significantly different patterns of data transfers, and the one or more embodiments that have neural networks for each application can provide, in some circumstances, improved results as compared to handling both applications 282A-B using the same neural network.

In alternative or additional features, a neural network can be created, trained, and updated for each of host devices 210A-B. One or more embodiments consider, for the identifying and predicting discussed herein, different configurations as being significant enough to warrant individual neural networks for an application. This can be done, even if the host devices are operating from the same hardware device, e.g., because of configuration differences, such as host device 210B not providing data for application 282B.

In an example of both concepts described above, FIG. 2 depicts a neural network per application 282A-B, and per host device 210A-B. Thus, application 282A, having data stored on both of host devices 210A-B, has a neural network on each of the host devices, and application 282B, being only on host device 210A, only has a neural network on that host device.

Having a neural network 260A1-A2 on both of host device 210A-B is discussed further with FIGS. 5 and 6 below, with examples of aggregated write operations across multiple host devices being described.

Figure 3:
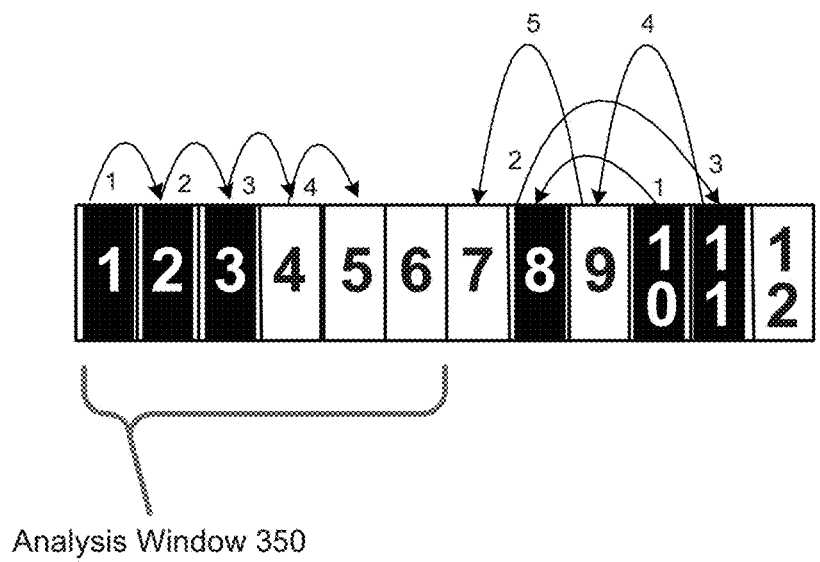
FIG. 3 depicts non-limiting examples of reading and caching operations in a system that can facilitate caching based on predicted patterns of data transfer operations, in accordance with one or more embodiments.

FIG. 3 depicts non-limiting examples of read and cache operations in a system that can facilitate caching based on predicted patterns of data transfer operations, in accordance with one or more embodiments. Repetitive description of like elements and/or processes employed in respective embodiments is omitted for sake of brevity.

As noted above, one or more embodiments can use ML techniques to facilitate one or more embodiments described herein. In this regard, ML component 170 can perform classifications, correlations, inferences and/or expressions associated with principles of machine learning and artificial intelligence. In one example, ML component 170 can employ a probabilistic and/or statistical-based analysis (e.g., factoring into the analysis throughput and costs) to learn and/or generate inferences. ML component 170 can also employ any suitable machine-learning based techniques, statistical-based techniques and/or probabilistic-based techniques. For example, ML component 170 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based and deep context-based analytical systems, systems employing Bayesian models, etc. In another aspect, ML component 170 can perform a set of machine learning computations. For example, ML component 170 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Two examples discussed below are based on logical block addresses (LBAs) from 1-12, and describe one or more embodiments that can perform, using the identifying and predicting described above, read operations related to caching, e.g., cache eviction and anticipatory caching.

Shown with LBAs 1-5, in a first example, based on monitored read operations, a pattern of repeated, sequential reads is identified, and a pattern of LBAs 1, 2, 3, 4, 5, 1, 2, 3, 4, 5, 1, 2, . . . is predicted. In this example, the performance of a cache holding four pages can be advantageously improved, based on one or more embodiments. In this example, after pages 1-4 are read, and stored in the cache, LBA 5 is read, and a cache entry (1, 2, 3, or 4) can be selected for eviction, to provide space to store LBA 5. In an approach that does not utilize the example pattern noted above, because LBA 1 was the last to be stored in the cache, this value is evicted. Alternatively, using the pattern determined by one or more embodiments, because LBA 1 is predicted to be the be the next page address read from, and because LBA 4 is predicted to be the longest from being used (e.g., after LBAs 1, 2, and 3 are retrieved), page 4 is evicted from the cache when page 5 is stored.

To determine the 1-5 pattern described above, one or more embodiments used an analysis window 350 of 6 or greater, e.g., because analysis window 350 was large enough to be able to consider sufficient pages to detect the pattern: LBAs 1, 2, 3, 4, 5, 1, . . . . In one or more embodiments, analysis window 350 can be enlarged or reduced in size based on analysis of factors including, but not limited to, the length of other patterns identified for the application or host device.

In a second example, shown with LBAs 7-12, one or more embodiments can detect a read pattern that is not consecutive for memory addresses (e.g., such as the first example with LBAs 1-5). In this example, as depicted, the pattern is LBA 10, 8, 11, 9, and 7. One way to implement prefetching cache entries is to select memory locations consecutive to the last read location. Using this approach for this example, after the reading of the value in LBA 11, the value in adjacent LBA 12 can be prefetched. Because, as identified by one or more embodiments, the next retrieved LBA will be LBA 9, storing the value of LBA 12 is not useful. In contrast, because one or more embodiments, based on the identified pattern, can prefetch the value in LBA 9, performance of the system can be improved.

FIG. 4 illustrates a chart of underlying data of an example implementation of one or more embodiments. Repetitive description of like elements and/or processes employed in respective embodiments is omitted for sake of brevity.

As noted above, one or more embodiments can use one or more neural networks to facilitate the features described herein. One approach to training a neural network to handle a type of I/O profile is by providing data that can be analyzed by the neural network, a result can be generated by the neural network, and the result can be compared to the actual result based on the data provided. One or more embodiments can provide the training data based on trace events generated by the modeled systems, e.g., on host device 210A, for neural network 260B, data can be collected for the read operations for application 282B.

In an example, the data used for chart 400 on FIG. 4 was collected from read operations of an online transaction processing (OLTP) system. Values that can be collected and provided for the training of neural networks include, but are not limited to, timestamp, host adapter, initiator, port, type of operation, device or volume of the related host device 210A, and the LBA of the read operation. In this example, the I/O profile in the data trace shows an execution of an OLTP workload. FIG. 4 depicts the LBAs referenced over time in a time-series plot, e.g., LBA 415 and time 410.

One or more embodiments can analyze the data and identify repeatable patterns where the I/O application re-accesses the same LBA range. For example, for interval 450 in chart 400, starting at point 455 (e.g., LBA is 8K at this point), over the remainder of the interval 450 the LBA increases at a regular rate, ending interval 450 and resetting back to the LBA of point 455, e.g., highlighted by range 457.

Figure 5:
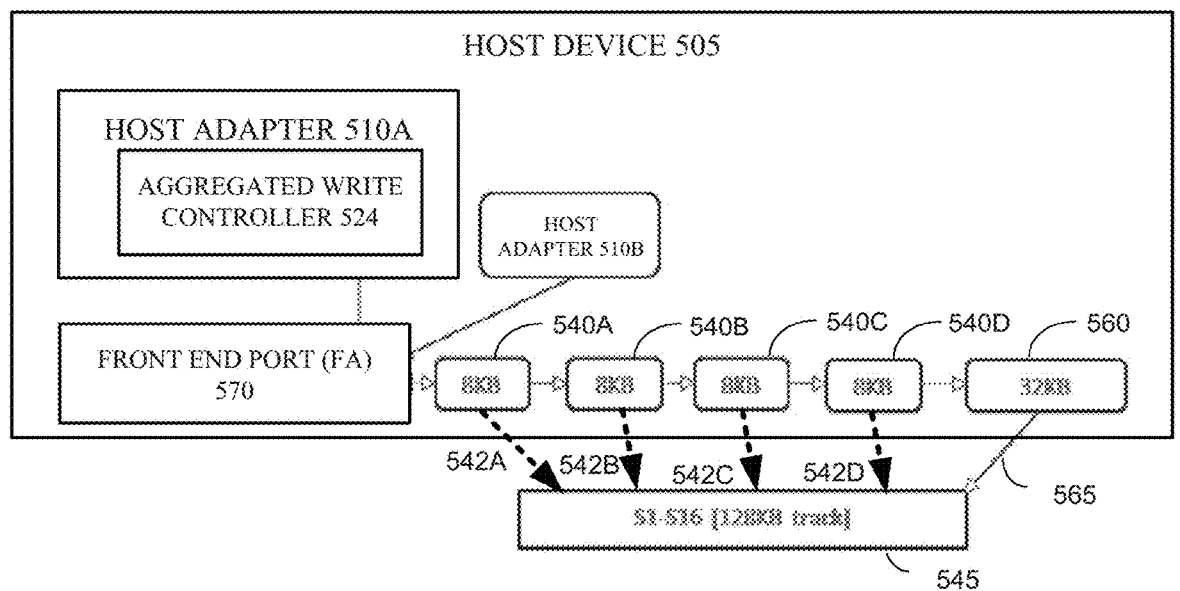
FIG. 5 illustrates an implementation of an example, non-limiting system that can facilitate aggregated write operations based on predicted patterns of data transfer operations, in accordance with one or more embodiments.
Figure 6:
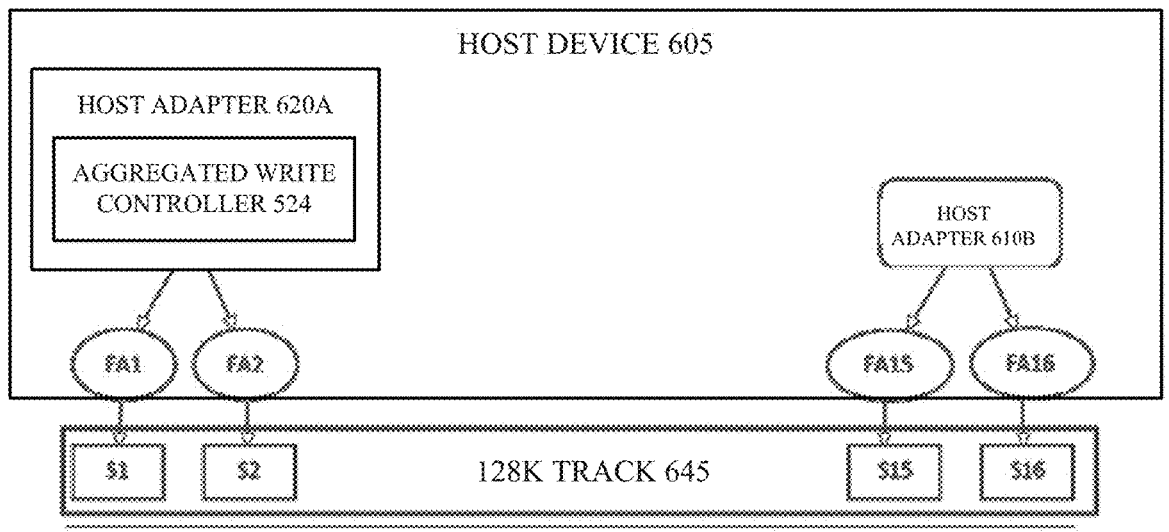
FIG. 6 illustrates a non-limiting system that can facilitate aggregated write and caching operations based on predicted patterns of data transfer operations, in accordance with one or more embodiments.

FIGS. 5-6 describe one or more embodiments that can facilitate aggregation of write operations across multiple host adapters, multiple paths and single host adapter, and multiple paths, based on prediction approaches described above (e.g., LSTM neural networks), in accordance with one or more embodiments.

FIG. 5 illustrates an implementation of an example, non-limiting system that can facilitate aggregated write operations based on predicted patterns of data transfer operations, in accordance with one or more embodiments. Repetitive description of like elements and/or processes employed in respective embodiments is omitted for sake of brevity.

As depicted, in one example approach, host device 505 can have host adapters 510A-B can communicate data to be written to one or more front end ports (FA) 570, and these data can be written 542A-D in parallel by the one or more FAs 570 in blocks 540A-D after a single exclusive atomic lock structure restricts the entire track 545 of LBA, e.g., by locking component 167. In one or more embodiments, the write operation determined to be the last operation can cause the lock on track 545 to be removed.

In an example, track 545 is 128K divided into 16 slots of 8K each, and blocks 540A-D are 8K each. In some circumstances, this complete locking approach can provide good performance, e.g., I/O profiles with large sequential or random blocks. With this approach, for certain patterns of operations, performance degradation can occur when system resources are quiesced behind the singular exclusive lock for each access to a 128 KB track of LBAs.

In other circumstances, if the I/O profile has different characteristics, one or more embodiments can, in some circumstances provide improved performance. For example, with respect to patterns of sector-aligned, sequential, small-block writes, in some circumstances these patterns can be identified by one or more embodiments described herein. As described above with FIGS. 3-4 for read operations, machine learning approaches can be used to identify and predict patterns of data transfer operations based, for example, in neural networks trained by trace outputs.

With respect to write operations, the above described neural networks can also be used to detect patterns of writes, e.g., by training the neural networks with traces that record write operations in the system. In one or more embodiments having multiple host adapters 510A-B as depicted in FIG. 5, a stream of write operations can be analyzed by embodiments by different combining approaches, including, but not limited to, data sharing between host adapters 510A-B.

When a pattern of write operations is identified, one or more embodiments can predict when the pattern is starting, and the window size of the pattern, e.g., the length of the block of data to be written. Characteristics of identified patterns can be stored and used when future operations of the analyzed application are performed.

For example, as operations are received, they are analyzed to detect previously identified patterns. Once the analysis detects the beginning of an identified pattern, when the pattern data starts to be received, instead of locking track 545 immediately, aggregated write controller 524 can temporarily hold 560 the pattern values as they are received, keeping track 545 unlocked. When the pattern data to be written has been received and stored, locking component 167 can lock track 545 and write 565 the held 560 data all at once.

In an additional feature of the above aggregated write process, one or more embodiments can identify that a potential pattern of write operations have overlapping portions, e.g., write operations received for LBAs 1, 3, 4, 1, 3, with the second instance of LBAs 1 and 3 overlapping the first instances. In this circumstance, one or more embodiments can process the pattern in ways including, but not limited to, using a component such as aggregated write controller to reconcile the overlapping portions while the data is aggregated and held 560 for writing 565. For example, in the above example overlapping sequence (e.g., 1, 3, 4, 1, 3), the first 1 and 3 can be dropped from the storage, and the second instances of 1 and 3 can be written. This can, in some circumstances have performance benefits because the initial writing of 1 and 3 is avoided. In an alternative approach to the detection of overlapping portions to be written, one or more embodiments can also prevent the pattern from being used for aggregated write operations.

FIG. 6 illustrates a non-limiting system that can facilitate aggregated write and caching operations based on predicted patterns of data transfer operations. Repetitive description of like elements and/or processes employed in respective embodiments is omitted for sake of brevity.

Host device 605 can access 128K track 645 across multiple paths, which can be connected to multiple host adapters 610A-B or clusters. In one or more embodiments, host device 605 can use host based load balancer drivers to distribute the incoming read and write operations across multiple paths and multiple host adapters or clusters. In one or more embodiments, in some circumstances a work load across different host adapters can increase 110 performance by reducing the queue depth. In one or more embodiments, write operations coming from multiple paths to same track can write to track 645 in parallel.

Figure 7:
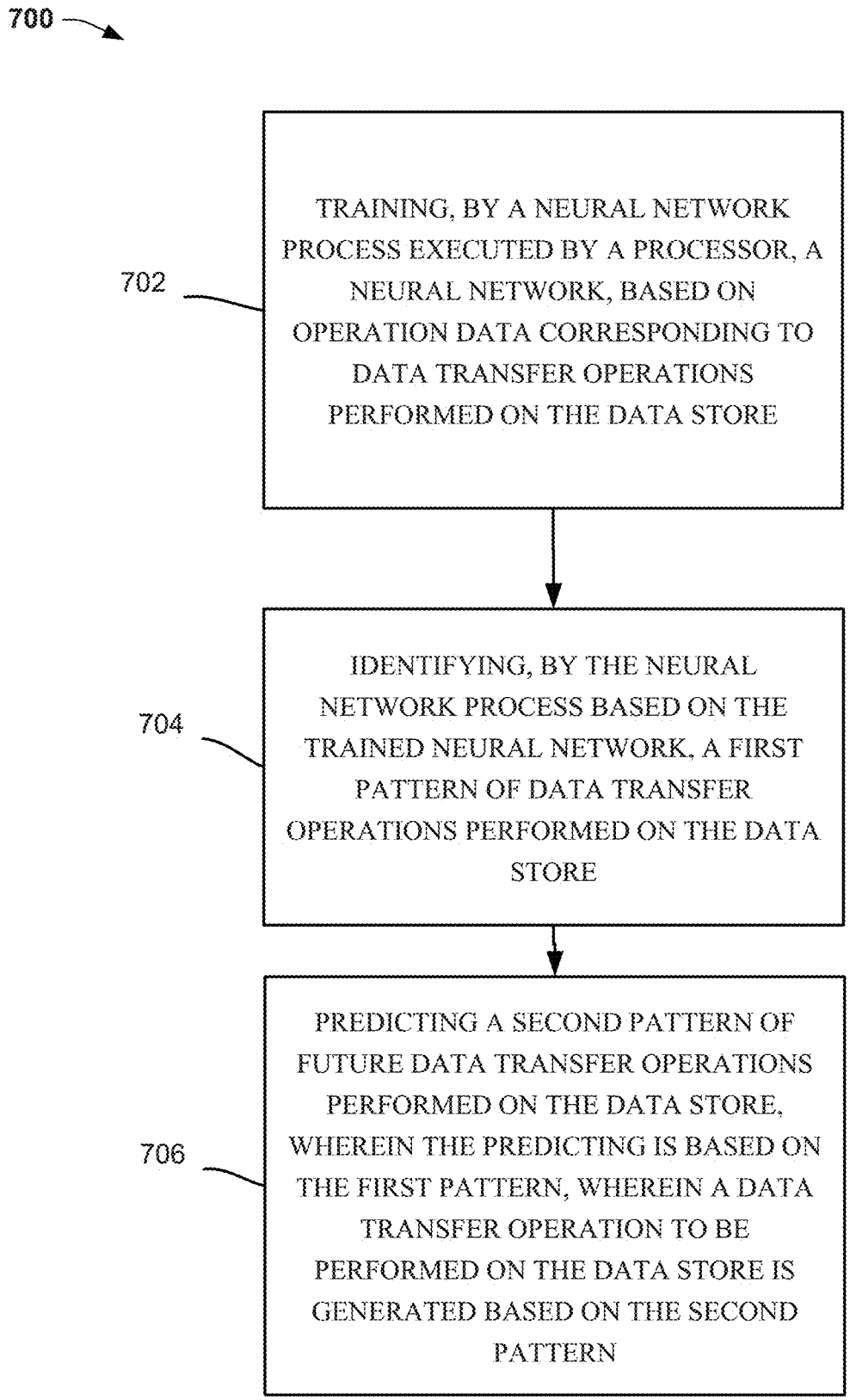
FIG. 7 illustrates an example flow diagram for a method that can facilitate caching and aggregated write operations based on predicted patterns of data transfer operations, in accordance with one or more embodiments.

FIG. 7 illustrates an example flow diagram for a method 700 that can facilitate caching and aggregated write operations based on predicted patterns of data transfer operations, in accordance with one or more embodiments. For purposes of brevity, description of like elements and/or processes employed in other embodiments is omitted.

At element 702, method 700 can comprise training, by neural network process 265 executed by processor 130, neural network 260A1, based on operation data corresponding to data transfer operations (e.g., for the operation of application 282A) performed on data store 216A.

At element 704, method 700 can comprise identifying, by neural network process 265, based on the trained neural network, 260A1 a first pattern of data transfer operations performed on data store 216A.

At element 706, method 700 can comprise predicting, by neural network process 265, a second pattern of future data transfer operations performed on data store 216A, wherein the predicting is based on the first pattern, and wherein a data transfer operation to be performed on data store 216A is generated based on the second pattern.

Figure 8:
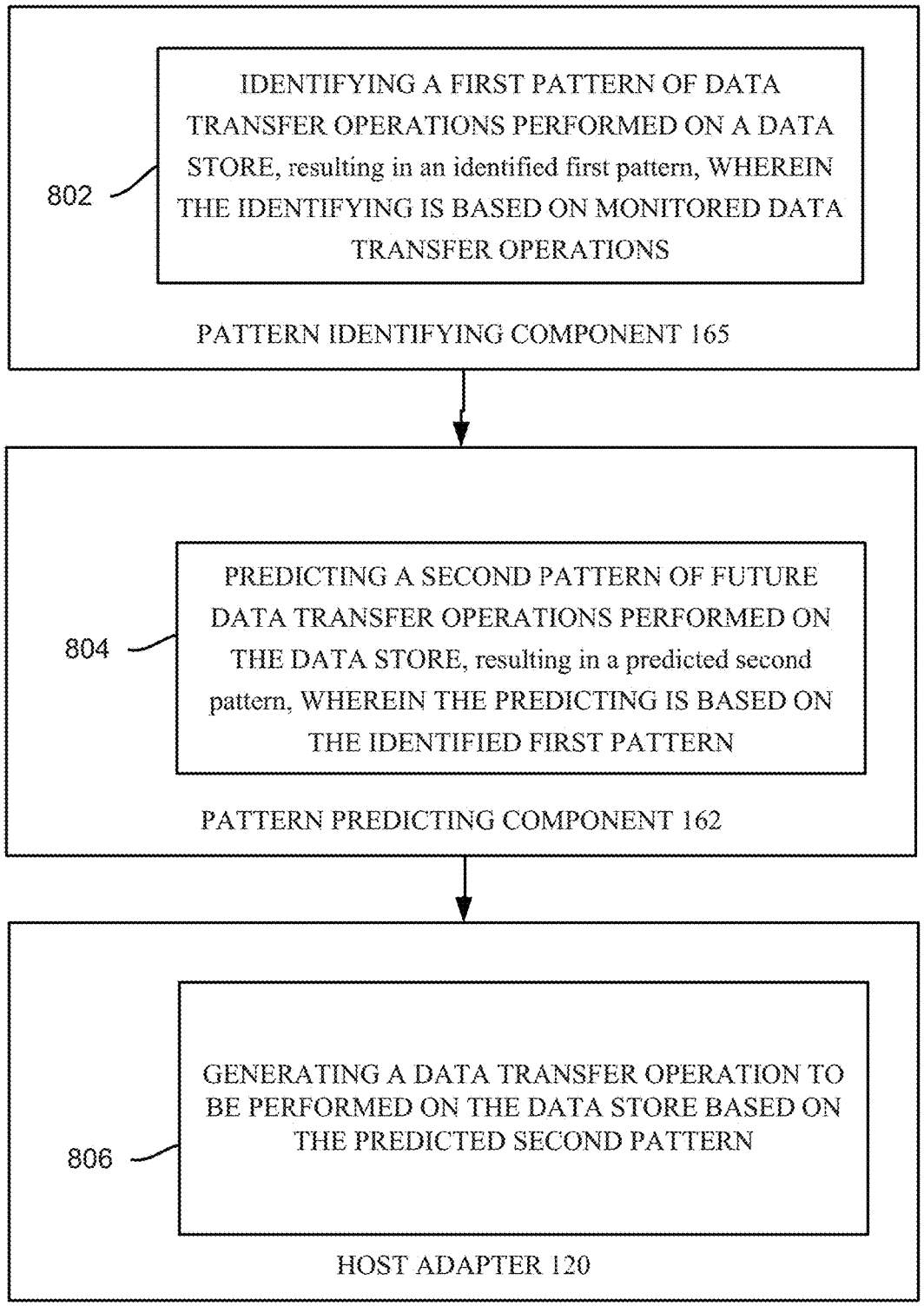
FIG. 8 is a flow diagram representing example operations of system comprising a pattern identifying component, a pattern predicting component, and a host adapter, in accordance with one or more embodiments.

FIG. 8 is a flow diagram representing example operations of system comprising a pattern identifying component 162, a pattern predicting component 165, and a host adapter 120, in accordance with one or more embodiments. For purposes of brevity, description of like elements and/or processes employed in other embodiments is omitted.

Pattern identifying component 165 can be configured 802 to identify a first pattern of data transfer operations (e.g., chart 400) performed on a data store 116, resulting in an identified first pattern, wherein the identifying is based on monitored data transfer operations, e.g., data transfer operations for application data 155.

Pattern predicting component 162 can be configured 804 to predict a second pattern of future data transfer operations performed on data store 116, resulting in a predicted second pattern, wherein the predicting is based on the identified first pattern. Host adapter 120 can be configured 806 to generating a data transfer operation to be performed on the data store based on the second pattern.

Figure 9:
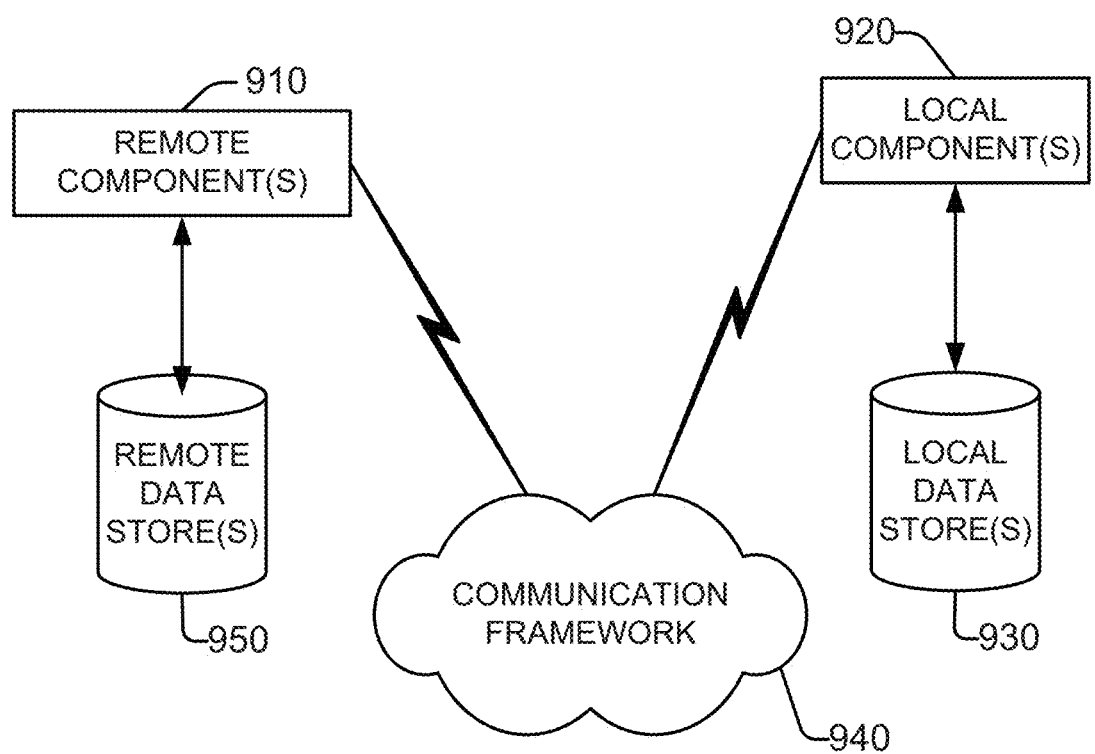
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
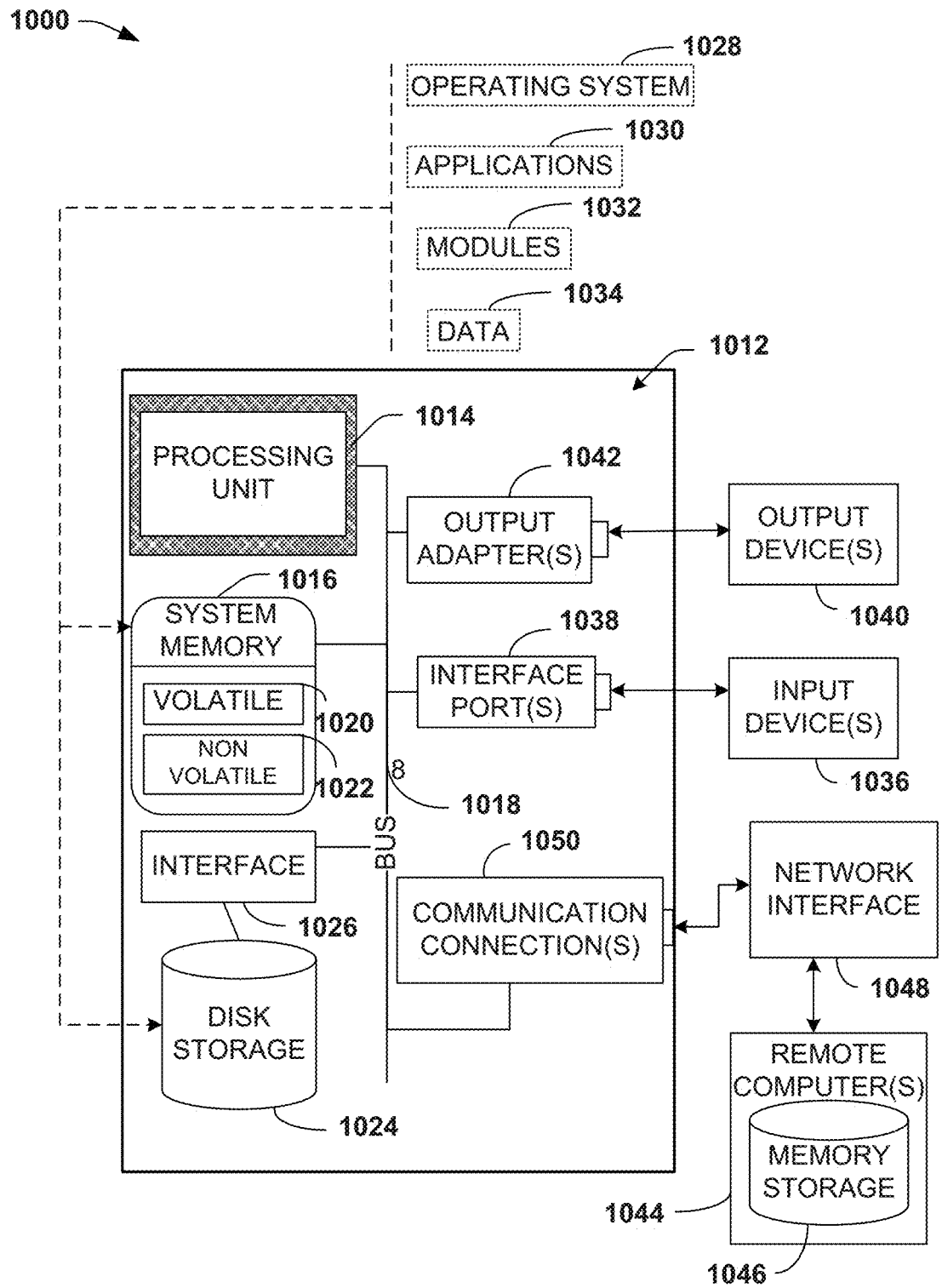
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and non-volatile memory 1022. A basic input/output system, containing routines to transfer information between elements within computer 1012, such as during start-up, can be stored in non-volatile memory 1022. By way of illustration, and not limitation, non-volatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in a suitable operating environment, e.g., computing system 1000. Such software comprises an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to system bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a memory that stores computer executable components; and
a processor that executes the computer executable components stored in the memory, wherein the computer executable components comprise:
a pattern identifying component to:
identify a first analysis window value, resulting in a first window value, and
identify a first pattern of data transfer operations performed on a data store, resulting in an identified first pattern, wherein the identifying is based on monitored data transfer operations and the first window value;
a pattern predicting component to:
select a second analysis window value, resulting in a second window value, wherein the selecting the second analysis window value is based on the first pattern, and
predict a second pattern of future data transfer operations performed on the data store, resulting in a predicted second pattern, wherein the predicting is based on the second window value; and
a host adapter to generate a data transfer operation to be performed on the data store based on the predicted second pattern.

2. The system of claim 1, wherein the pattern identifying component comprises a neural network trained based on the monitored data transfer operations, and wherein the identifying, by the pattern identifying component, the first pattern, is further based on an output from the neural network.

3. The system of claim 1, wherein the host adapter further executes the data transfer operation, wherein the first pattern comprises a pattern of recurrent data writing operations, and wherein the data transfer operation being executed comprises:
receiving write operations corresponding to the recurrent data writing operations; and
writing data corresponding to the recurrent data writing operations to the data store.

4. The system of claim 3, further comprising a locking component to lock, after the receiving the write operations, a portion of the data store corresponding to a destination for the write operations.

5. The system of claim 1, further comprising: an integration component to integrate first results of the pattern identifying component with second results of another pattern identifying component, wherein the predicting, by the pattern predicting component, the second pattern is further based on the second results.

6. The system of claim 1, wherein the monitored data events comprise a trace log of transactions of the data store.

7. The system of claim 1, wherein the host adapter further executes the data transfer operation, wherein the first pattern comprises a pattern of recurrent data operations, and wherein the data transfer operation being executed comprises:
receiving data operations corresponding to the recurrent data operations; and
performing the recurrent data operations on the data store.

8. The system of claim 1, wherein the identifying the first pattern by the pattern identifying component is further based on an analyzed pattern being written to sequential memory locations, and having operations that do not overwrite other values written by other operations of the analyzed pattern.

9. The system of claim 7, further comprising, a cache controller to, based on the second pattern, perform at least one of:
storing first written values in a cache;
evicting second values from the cache; or
pre-fetching third values to store in the cache.

10. A method, comprising:
training, by a neural network process executed by a processor, a neural network, based on operation data corresponding to data transfer operations performed on a data store;
identifying, by the neural network process, a first analysis window value, resulting in a first window value;
identifying, by the neural network process, based on the trained neural network and the first window value, a first pattern of data transfer operations performed on the data store;
selecting, by the neural network process, a second analysis window value, resulting in a second window value, wherein the selecting the second analysis window value is based on the first window value; and
predicting, by the neural network process, a second pattern of future data transfer operations performed on the data store, wherein the predicting is based on the second window value, and wherein a data transfer operation to be performed on the data store is generated based on the second pattern.

11. The method of claim 10, wherein the second pattern is predicted based on a length of the second pattern being less than or equal to the second window value.

12. The method of claim 10, wherein the first pattern is identified based on a length of the first pattern being less than or equal to the first window value.

13. The method of claim 12, further comprising, by the neural network process, based on the second pattern, one or more of:
storing first written values in a cache;
evicting second values from the cache; and
pre-fetching third values to store in the cache.

14. The method of claim 12, wherein the first pattern is a looping reference pattern.

15. The method of claim 10, wherein the neural network comprises a recurrent neural network, and wherein the identifying the first pattern is further based on analysis of the recurrent neural network.

16. The method of claim 10, wherein the monitored data events comprise a trace log of transactions of the data store.

17. A non-transitory computer-readable storage medium comprising executable instructions that, when executed by a processor, facilitate performance of operations, the operations comprising:
identifying a first analysis window value, resulting in a first window value;
identifying a first pattern of data transfer operations performed on a data store, wherein the identifying is based on monitored data transfer operations and the first window value;
selecting a second analysis window value, resulting in a second window value, wherein the selecting the second analysis window value is based on the first window value;
predicting a second pattern of future data transfer operations performed on the data store, wherein the predicting is based on the first pattern; and
generating a data transfer operation to be performed on the data store based on the second pattern.

18. The non-transitory computer-readable storage medium of claim 17, wherein the identifying of the first pattern is further based on a neural network trained based on the monitored data transfer operations.

19. The non-transitory computer-readable storage medium of claim 17, wherein the first pattern comprises a pattern of recurrent data reading operations, and wherein the operations further comprise:
receiving read operations corresponding the recurrent data reading operations; and
storing a value, read based on the read operations, in a cache.

20. The non-transitory computer-readable storage medium of claim 19, wherein the operations further comprise prefetching a value based on the second pattern.

* * * * *